Sept. 17, 1940.  H. W. WILKINSON  2,215,384
THERMOSTATIC CONTROL
Filed Sept. 28, 1938  2 Sheets-Sheet 1
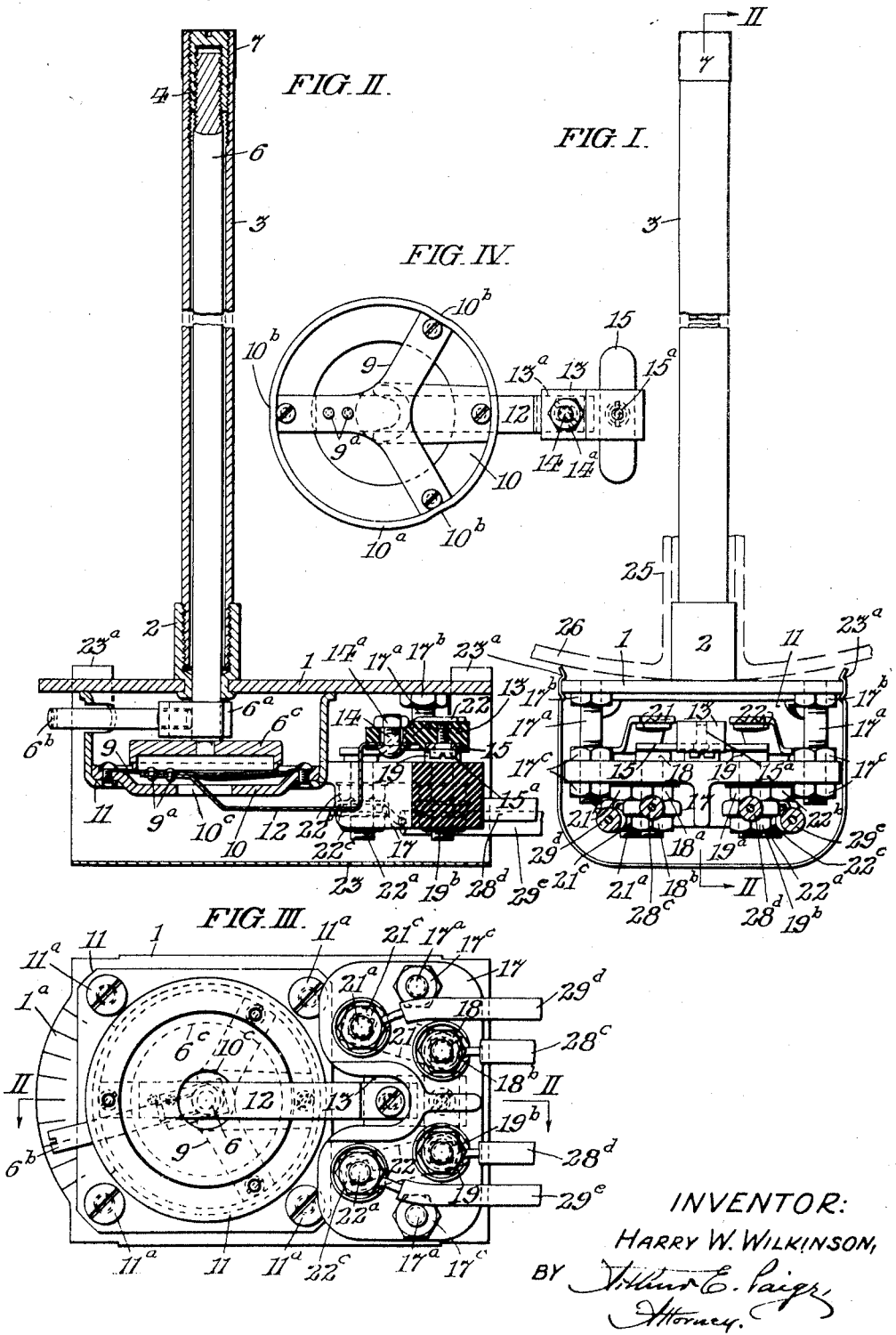
INVENTOR:
HARRY W. WILKINSON,
BY
Attorney.

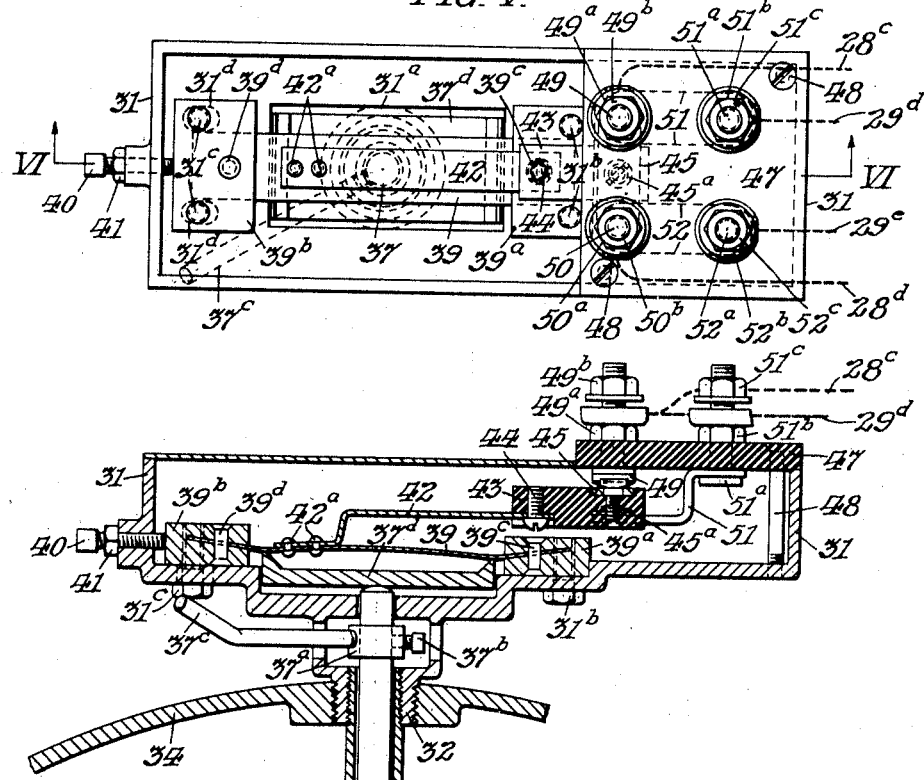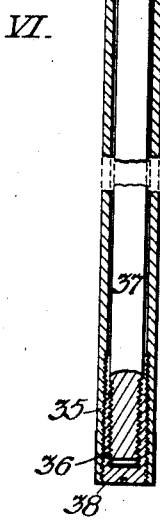

Patented Sept. 17, 1940

2,215,384

UNITED STATES PATENT OFFICE 2,215,384

THERMOSTATIC CONTROL

Harry W. Wilkinson, Mount Airy, Pa., assignor to John Wood Manufacturing Company, Inc., Conshohocken, Pa., a corporation of Delaware Application September 28, 1938, Serial No. 232,136

8 Claims. (Cl. 200—137)

My invention is designed and adapted for use in connection with a water heater included in a house water supply system and comprising a container which is a hot water reservoir; with the object and effect of regulating the temperature of the water stored in said reservoir, by controlling a plurality of electrical resistance heating units disposed at different levels in the reservoir.

In the form of my invention hereinafter described, the thermostatic element is a couple, including two members differentially effected by temperature, and imparts movement to a spring switch lever, to shift it to and from electrical contact with terminals of an electrical circuit, which are bridged by a conducting contact member carried by said switch lever, to close said circuit. A snap spring device is interposed between said thermostatic element and said switch lever to effect snap action of the latter; the snap spring element being formed of a primarily plane sheet of spring metal.

My invention includes a method and means of calibrating the snap spring to precisely determine the temperatures at which it shall be snapped in alternately opposite directions in accordance with the expansion and contraction of said thermostatic elements. As hereinafter described, such calibration may be effected by stressing the primarily plane snap spring on a line of force in its plane, to cause it to take an arcuate form with its convex surface toward the thermostatic element. In one form of my invention hereinafter described, such calibration is conveniently effected by a hammer blow or blows upon a circular frame in which the ends of radial arms of the snap spring are fixed, such blows serving to permanently distort said frame on such a line or lines of force. I also show a modified form of the invention in which such adjustment of the snap spring is effected by axial movement of a set screw, so that the temperature at which the spring shall snap may be adjustably varied at any time, by rotation of said screw.

My invention includes the various novel features of construction, arrangement and method of calibration and operation hereinafter more definitely specified.

In said drawings; Fig. I is a plan view of a thermostatic couple and its appurtenances conveniently embodying my invention and showing a fragmentary section of a water container having a cylindrical pocket in which said couple is slip fitted.

Fig. II is a vertical sectional view of said structure taken on the line II, II in Fig. I, in the direction of the arrows on said line, but omitting said container.

Fig. III is an outside elevation of the outer end of the structure shown in Figs. I and II, but omitting its sheet metal cover.

Fig. IV is a detached, inside, elevation of the snap spring in its circular casing and the spring switch lever connected therewith.

Figs. V and VI show a modified form of my invention, including the aforesaid screw device for effecting adjustment of the snap spring. Fig. V is an outside elevation of the structure with the cover plate removed. Fig. VI is a sectional view taken on the line VI, VI in the direction of the arrows in Fig. V, but including the cover plate.

Referring to the form of my invention shown in Figs. I to IV inclusive, the frame plate I has the tubular pipe fitting 2 rigidly connected therewith, conveniently by clinching the outer end of said fitting in said plate, as shown in Fig. II. The thermostatic couple includes the outer tube 3 which is conveniently formed of copper and has its outer end screwed into said fitting 2. The inner end of said couple member 3 is internally screw threaded to receive the cup shaped bushing 4 which is internally screw threaded to receive the inner end of the other member 6 of the thermostatic couple, which is conveniently formed of a ferric alloy known to the trade as "Invar". Said bushing 4 is conveniently employed to effect primary adjustment of the members of the couple at the factory and when assembled is rigidly connected with the couple member 3 by dipping it into melted solder, indicated at 7 in Figs. I and II.

The outer end of said couple member 6 has the collar 6a rigidly connected therewith by the screw 6b which, as indicated in Fig. III, also serves as a handle and index pointer to effect rotary, and consequent axial, adjustment of said couple member 6, with reference to the arcuate scale Ia formed on said frame plate I, as shown in Fig. III. Said couple member 6 has, rigidly connected therewith at its outer end, the thrust disk 6c which has an annular rim presented outwardly for contact with the three radial arms of the snap spring 9.

As shown in Fig. IV, each of said arms is rigidly connected at its outer end with the circular frame 10 in close spaced relation with the annular rim 10a on said frame. In that form of my invention the snap spring is calibrated as above contemplated by hammer blows directed radially inward upon said rim 10a forming slight indentations therein as indicated at 10b in Fig. IV. As indicated in Figs. II and III, said circular frame 10 is push fitted into rigid relation with the cup shaped frame member 11. As shown in Fig. III, said frame member 11 has the rectangular flange in contact with the frame plate I to which it is rigidly secured, conveniently by four screws 11a.

As indicated in Figs. II, III, and IV; said snap spring 9 is rigidly connected, conveniently by two rivets 9a, with one end of the spring lever 12. As best shown in Fig. II, said lever 12 extends through the hole 10c in the circular frame 10 and radially outward with respect to said frame and snap spring 9, and carries at its outer free end the block of insulating material 13, conveniently Bakelite or similar material which is rigidly connected therewith by the bolt 14 and nut 14a; the free end of said spring lever 12 being closely fitted in the rectangular recess 13a, as indicated in dotted lines in Fig. IV. Said insulating block 13 has rigidly connected therewith the metal contact bridge 15, conveniently by the screw 15a; said element 15 being closely fitted in a recess in said block 13, as shown in Fig. II.

As best shown in Fig. I; the frame plate 1 has the insulating block 17 rigidly connected therewith by two bolts 17a, each engaged by one nut 17b, and by two nuts 17c.

As best shown in Fig. I; said insulating block 17 has rigidly connected therewith two electric circuit terminals 18 and 19, which are heads of screws which extend through said block 17 and are rigidly connected therewith by nuts 18a and 19a.

As indicated in Figs. I, II, and III; said insulating block 17 also has, rigidly connected therewith, two electric circuit terminals 21 and 22, conveniently by screws 21a and 22a, with the heads of which said terminals are rigidly connected. As shown in Figs. I and II; said terminals 21 and 22 are offset with respect to said insulating block 17 so as to be presented upon the inner side of said bridge contact element 15 respectively axially opposite to said circuit terminals 18 and 19. Said terminals 21 and 22 are rigidly secured in connection with said insulating block 17, by nuts 21b and 22b.

The construction and arrangement last above described are such that said spring lever 12 normally holds its bridge contact member 15 in contact with said terminals 18 and 19, and in spaced relation with said terminals 21 and 22, as shown in Fig. I. However, when said thermostatic couple 3, 6 is subjected to the temperature for which the index handle 6b is set with reference to the arcuate scale 1a shown in Fig. III; the couple member 3 has expanded to such length as to carry the thrust disk 6c of the other couple member 6 axially away from the snap spring 9 so as to permit the latter to gradually release its stress upon said spring lever 12, until the critical temperature is reached at which said snap spring snaps from its outwardly convexed form shown in Fig. II to inwardly convexed form, with the effect of instantly separating said bridge contact element 15 from the circuit terminals 18 and 19 and into contact with the terminals 21 and 22.

It is to be particularly noted that in devices including snap springs the convexity of which is reversed in accordance with contraction and expansion of a thermostatic couple, there is considerable lost motion, known to the trade as "creep" as the snap spring approaches the critical position in which it will snap to reverse its convexity, and if the motion of the snap spring be rigidly transmitted to electrical switch mechanism, there is not only considerable consequent delay in the making and breaking of the circuit, but the differential between the temperature at which the circuit is opened and the temperature at which it is closed is excessive. The present invention is advantageous in that the "creep" is absorbed by flexure of the spring lever 12 which also multiplies the movement of the snap spring by the thermostatic couple; so that a considerable air gap is permissible between the opposed terminals 18, 19 and 21, 22 of the electric circuit, as shown in Fig. I, and the differential between the temperatures at which the switch will open and close is reduced to the minimum.

I find it convenient to provide the structure above described with a resilient sheet metal cover 23 which has four spring tabs 23a so that it may be snapped into detachable engagement with said frame plate 1, but is readily removable.

As indicated in Fig. I; the tubular pipe fitting 2 may be slip fitted in a cylindrical pocket formed by a tube 25 rigidly connected with the cylindrical wall 26 of a water container, so that the thermostatic couple 3, 6 is subjected to the temperature of the water in said container, thus excluded from it.

In the form of my invention shown in Figs. V and VI; the frame 31 is a cast metal box having in unitary relation therewith the tubular pipe fitting 32 adapted to be screwed into the cylindrical wall of a water container 34. The thermostatic couple includes the outer tube 35 which is conveniently formed of copper and has its outer end screwed into said fitting 32. The inner end of said couple member 35 is internally screw threaded to receive the cup shaped bushing 36 which is internally screw threaded to receive the inner end of the other member 37 of the thermostatic couple, which is conveniently formed of a ferric alloy known to the trade as "Invar." Said bushing 36 is conveniently employed to effect primary adjustment of the members of the couple at the factory and when assembled is rigidly connected with the couple member 35 by solder indicated at 38 in Fig. VI.

The outer end of said couple member 37 has the collar 37a rigidly connected therewith by the set screw 37b. Said collar is also provided with the radial rod handle and index pointer 37c to effect rotary, and consequent axial, adjustment of said couple member 37. The outer end of said couple member 37 is continually in contact with the thrust plate 37d which has knife edges at its opposite ends presented outwardly for contact with the snap spring 39 near its respectively opposite ends. Said thrust plate 37d is located in the rectangular recess 31a in said frame 31, in which it is freely movable under stress of the thermostatic couple member 37 opposed by said spring 39.

The opposite ends of said spring 39 are respectively fixed in metal blocks 39a and 39b, conveniently by respective rivets 39c and 39d. Said block 39a is rigidly connected with said casing 31, by two set screws 31b and said block 39b is rigidly connected with said casing 31 by two set screws 31c; but the latter extend through respective elongated slots 31d in said casing 31, elongated in the direction of said snap spring 39; so that said block 39b may be released by loosening said screws 31c to permit said snap spring 39 to be more or less distorted from its initial plane form by means of the adjusting screw 40 by which force may be applied in a line coincident with the plane of said spring 39. When said screw 40 is rotated to set it in the position desired, it may be locked in such position by the lock nut 41 bearing against the end of said casing 31 and, thereupon, said block 39b may be rigidly connected with said casing 31 by said screws 31c.

Of course, such an arrangement as last above described permits the calibration of the snap spring 39 to be changed at any time as distinguished from the snap spring 9, the calibration of which cannot be readily changed; although it may be changed when the structure shown in Fig. IV is detached from the elements which cooperate therewith in the embodiment shown in Figs. I, II and III.

Referring to Figs. V and VI; the spring lever 42 is rigidly connected at one end to said snap spring 39, conveniently by the two rivets 42ᵃ. The free end of said spring lever 42 carries the block 43 of insulating material, conveniently Bakelite or other suitable composition, which has a recess in which the end of the spring fits and is held by the screw 44. Said insulating block 43 has rigidly connected therewith the metal contact bridge 45, conveniently by the screw 45ᵃ; said element 45 being closely fitted in a recess in said block 43, as shown in Fig. VI.

As shown in Figs. V and VI; the frame 31 has the insulating block 47 rigidly connected therewith conveniently by two screws 48. Said insulating block 47 has rigidly connected therewith two electric circuit terminals 49 and 50, which are heads of screws which extend through said block 47 and are rigidly connected therewith by nuts 49ᵃ and 50ᵃ. Said insulating block 47 also has, rigidly connected therewith, two electric circuit terminals 51 and 52, conveniently by screws 51ᵃ and 52ᵃ with the heads of which said terminals are rigidly connected. As shown in Fig. VI; said terminals 51 and 52 are offset with respect to said insulating block 47 so as to be presented upon the inner side of said bridge contact element 45 respectively axially opposite to said circuit terminals 49 and 50. Said terminals 51 and 52 are rigidly secured in connection with said insulating block 47 by nuts 51ᵇ and 52ᵇ

As shown in Figs. V and VI; conductors 28ᶜ and 28ᵈ are respectively connected with the terminals 49 and 50, by cup washers and respective nuts 49ᵇ and 50ᵇ. Conductors 29ᵈ and 29ᵉ are respectively connected with terminals 51 and 52 by cup washers and respective nuts 51ᶜ and 52ᶜ.

However, I do not desire to limit myself to the precise details of construction, arrangement, method of calibration, or operation herein set forth, as it is obvious that various modifications may be made therein without departing from the essential features of my invention as defined in the appended claims.

I claim:

1. In a thermostatically operative structure; the combination with a circular saucer-shaped stationary frame having an axial opening therethrough and an annular flanged rim; of a snap spring formed of primarily plane sheet metal, having three radial arms fitted in said frame, within said rim; means rigidly connecting the outer end of each of said arms in rigid relation with said frame; said rim being bent inwardly at the ends of two of said arms, whereby said spring is subjected to compression edgewise toward its axial region and distorted from its normally plane shape and convexed outwardly from said frame with its axis in eccentric relation to said frame, but said spring is thus arranged to snap alternately in axially opposite directions, transversely to its plane, in accordance with the pressure to which it is subjected on its side thus convexed; a spring lever rigidly connected at one end with one of the radial arms of said snap spring and having a portion obliquely offset from said snap spring, extending through the axial hole in said frame and radially from said spring in a direction opposite to said arm to which it is rigidly connected and between the other two arms which are distorted; an electrical contact element, carried by the free end of said lever, remote from said snap spring; an electrical circuit terminal, arranged to be contacted by said switch contact element, in one extreme position of said snap spring and lever, and released from such contact only when said snap spring is subjected to such pressure at its axial region as to snap it transversely to its plane; a thermostatic couple, comprising an outer tube having one end in rigid relation with said circular frame, in coaxial relation therewith and capable of axial elongation and retraction in accordance with the temperature to which it is subjected, the other member of said couple being a rod in coaxial relation with said tube and snap spring, having its end remote from said snap spring rigidly connected with said tubular couple member, and its opposite end separate from and in spaced relation with said snap spring; said rod being substantially invariable in length by the temperatures which elongate and contract said tubular member; a thrust disk, rigidly connected with the end of said rod in spaced relation with said snap spring and having an annular rim in contact with said snap spring, but entirely separate therefrom; whereby, said spring lever holds its switch contact element in contact with said circuit terminal during such increment of temperature as to flex said snap spring until said snap spring reaches the point at which it will instantly snap transversely to its plane, and said switch contact element remains out of contact with said circuit terminal during such decrement of temperature as permits movement of said snap spring toward its original position, until it reaches the point at which it will snap toward its original position, and thereby said circuit is closed and opened at respective precisely predetermined differential temperatures.

2. A structure as in claim 1; wherein the end of the rod remote from the snap spring is rigidly connected with the tube by a screw thread; and the opposite end of said rod has rigidly connected therewith a collar, and an element projecting from said collar in radial relation with said rod, serving as a handle to turn said rod and thrust disk independently of said snap spring, and thereby adjustably vary the relative longitudinal position of said rod and tube and consequently vary the temperatures at which the reversal of said snap spring shall be effected by changes in temperature to which the thermal couple is subjected.

3. In a thermostatically operative structure; the combination with a circular stationary frame having an opening therethrough and a flanged rim; of a snap spring formed of primarily plane sheet metal, having three radial arms fitted in said frame, within said rim; means rigidly connecting the outer end of each of said arms in rigid relation with said frame; said rim being bent inwardly at the ends of two of said arms, whereby said spring is subjected to compression edgewise toward its axial region and distorted from its normally plane shape and convexed outwardly from said frame with its axis in eccentric relation to said frame, but said spring is thus arranged to snap alternately in axially opposite directions, transversely to its plane, in accordance with the pressure to which it is subjected on its side thus convexed; a spring lever rigidly connected at one end with said snap spring and having a portion offset from said snap spring, extending through the hole in said frame and radially from said spring between the two arms which are distorted; an electrical contact element, carried by the free end of said lever, remote from said snap spring; an electrical circuit terminal, arranged to be contacted by said switch contact element, in one extreme position of said snap spring and lever, and released from such contact only when said snap spring is subjected to such pressure at its axial region as to snap it transversely to its plane; a thermostatic couple, comprising a member having one end in rigid relation with said circular frame, and capable of axial elongation and retraction in accordance with the temperature to which it is subjected, the second member of said couple having its end remote from said snap spring rigidly connected with said first couple member, and its opposite end separate from and in spaced relation with said snap spring; said second couple member being substantially invariable in length by the temperatures which elongate and contract said first member; a thrust disk, rigidly connected with the end of said second member, in spaced relation with said snap spring and having an annular rim in contact with said snap spring, but entirely separate therefrom; whereby, said spring lever holds its switch contact element in contact with said circuit terminal during such increment of temperature as to flex said snap spring until said snap spring reaches the point at which it will instantly snap transversely to its plane, and said switch contact element remains out of contact with said circuit terminal during such decrement of temperature as permits movment of said snap spring toward its original position, until it reaches the point at which it will snap toward its original position, and thereby said circuit is closed and opened at respective precisely predetermined differential temperatures.

4. A structure as in claim 3; including means carried by said second couple member, adjustably movable independently of the snap spring, to adjustably vary the relative longitudinal position of said couple members and consequently vary the temperatures at which the reversal of said snap spring shall be effected by changes in temperature to which the thermal couple is subjected.

5. In a thermostatically operative structure; the combination with a circular saucer-shaped stationary frame having an axial opening therethrough; of a concavo-convex snap spring formed of primarily plane sheet metal, having its perimeter fixed in said stationary frame; said spring being arranged to snap alternately in axially opposite directions, transversely to its plane, in accordance with the pressure to which it is subjected on one face thereof; a spring lever rigidly connected at one end with said snap spring and having a portion offset from said snap spring, extending through the axial hole in said frame and radially from said snap spring; an electrical contact element, carried by the free end of said lever, remote from said snap spring; an electrical circuit terminal, arranged to be contacted by said switch contact element, in one extreme position of said snap spring and lever, and released from such contact only when said snap spring is subjected to such pressure at its axial region as to cause it to snap transversely to its plane; a thermostatic couple, comprising an outer tube having one end in rigid relation with said circular frame, in coaxial relation therewith and capable of axial elongation and retraction in accordance with the temperature to which it is subjected, the other member of said couple being a rod in coaxial relation with said tube and snap spring, having its end remote from said snap spring rigidly connected with said tubular couple member and its opposite end separate from and in spaced relation with said snap spring; said rod being substantially invariable in length by the temperatures which elongate and contract said tubular member; a thrust disk, rigidly connected with the end of said rod in spaced relation with said snap spring and having an annular rim in contact with said snap spring, but entirely separate therefrom; whereby, said spring lever holds its switch contact element in contact with said circuit terminal during such increment of temperature as to flex said snap spring until said snap spring reaches the point at which it will instantly snap transversely to its plane, and said switch contact element remains out of contact with said circuit terminal during such decrement of temperature as permits movement of said snap spring toward its original position, until it reaches the point at which it will snap toward its original position, and thereby said circuit is closed and opened at respective precisely predetermined differential temperatures.

6. A structure as in claim 5; wherein the end of the rod remote from the snap spring is rigidly connected with the tube by a screw thread; and the opposite end of said rod has rigidly connected therewith a collar, and an element projecting from said collar in radial relation with said rod, serving as a handle to turn said rod and thrust disk independently of said snap spring, and thereby adjustably vary the relative longitudinal position of said rod and tube and consequently vary the temperatures at which the reversal of said snap spring shall be effected by changes in temperature to which the thermal couple is subjected.

7. A structure as in claim 5; wherein there are two electrical circuit terminals, arranged to be simultaneously contacted by the switch contact element and said contact element is a bridge of electrical conducting material adapted to close the circuit between said terminals; and a dielectric element is interposed between said spring lever and said bridge contact member to relatively insulate them.

8. A structure as in claim 5; wherein there are two pairs of electrical circuit terminals, arranged to be alternately contacted by the switch contact element and said contact element is a bridge of electrical conducting material adapted to close the circuit between each pair of terminals in alternation; and a dielectric element is interposed between said spring lever and said bridge contact member to relatively insulate them; whereby the circuit between one pair of terminals is closed when said tubular thermal member is cooled below a limit temperature, and the circuit between that pair of terminals is broken and the circuit closed between the other pair of terminals when said tubular thermal member is heated above a temperature determined by the relative axial adjustment of the thermal members.

HARRY W. WILKINSON.